(12) United States Patent
Hipp et al.

(10) Patent No.: US 7,565,066 B2
(45) Date of Patent: Jul. 21, 2009

(54) FOOD TRANSPORT CONTAINERS

(75) Inventors: Wolfram Hipp, Neulingen-Nußbaum (DE); Timo Dieter, Kraichtal (DE)

(73) Assignee: BLANCO GmbH + Co KG, Oberderdingen (DE)

( * ) Notice: Subject to any disclaimer, the term of this patent is extended or adjusted under 35 U.S.C. 154(b) by 444 days.

(21) Appl. No.: 11/070,179

(22) Filed: Mar. 1, 2005

(65) Prior Publication Data
US 2006/0048533 A1    Mar. 9, 2006

(30) Foreign Application Priority Data
Aug. 21, 2004    (DE)    ................. 20 2004 013 093 U (51) Int. Cl.
*F24H 3/06*    (2006.01)

(52) U.S. Cl. ...................... 392/356; 392/358

(58) Field of Classification Search ................. 392/356, 392/373, 374, 355, 354, 360, 361, 347, 358; *F24H 3/06*
See application file for complete search history.

(56) References Cited

U.S. PATENT DOCUMENTS

| | | | | |
|---|---|---|---|---|
| 2,613,663 | A * | 10/1952 | Mitacek et al. | 126/110 B |
| 3,692,968 | A * | 9/1972 | Yasuoka | 219/681 |
| 3,809,503 | A * | 5/1974 | Schlicker et al. | 417/352 |
| 4,420,677 | A * | 12/1983 | Partington | 392/358 |
| 4,455,478 | A * | 6/1984 | Guibert | 219/400 |
| 4,471,753 | A * | 9/1984 | Yates | 126/110 R |
| 4,794,228 | A | 12/1988 | Braun, Jr. | |
| 5,437,001 | A * | 7/1995 | Chaney et al. | 392/376 |
| 5,655,055 | A * | 8/1997 | Goldstein et al. | 392/367 |
| 5,704,135 | A * | 1/1998 | Riahi | 34/546 |
| 6,054,686 | A * | 4/2000 | Pauly et al. | 219/400 |
| 6,054,886 | A * | 4/2000 | Opris et al. | 219/400 |
| 6,351,602 | B1 * | 2/2002 | Chaney et al. | 392/376 |
| 6,480,672 | B1 * | 11/2002 | Rosenzweig et al. | 392/365 |
| 2003/0128971 | A1 * | 7/2003 | Birdsell et al. | 392/368 |

FOREIGN PATENT DOCUMENTS

WO    WO2004004528    1/2004

OTHER PUBLICATIONS

International Search Report for PCT/EP03/06873, Oct. 31, 2003 (3 sheets).

* cited by examiner

*Primary Examiner*—Daniel L Robinson
(74) *Attorney, Agent, or Firm*—Hanley, Flight & Zimmerman, LLC (57) ABSTRACT

In order to provide a food transport container, comprising an air circulation device, by which air is taken in from the interior of the food transport container and blown out into the interior of the food transport container, wherein the air circulation device comprises at least one fan, that has a longer maintenance-free operating period and/or a longer useful life, it is proposed that the air circulation device comprises at least one air intake channel, through which the air is taken in by the fan indirectly from the interior of the food transport container.

18 Claims, 11 Drawing Sheets

FIG.11 ic # FOOD TRANSPORT CONTAINERS

RELATED APPLICATION

The present disclosure relates to the subject matter disclosed in German Utility Model No. 20 2004 013 093.9 of Aug. 21, 2004, the entire specification of which is incorporated herein by reference.

FIELD OF DISCLOSURE

The present disclosure relates to a food transport container, which comprises an air circulation device, by means of which air is taken in from the interior of the food transport container and blown out into the interior of the food transport container, wherein the air circulation device comprises at least one fan.

BACKGROUND

Such food transport containers are known from the background art.

In the known food transport containers of this type, the fan of the air circulation device takes in the air directly from the interior of the food transport container, with the result that dirt particles and other impurities pass from the interior of the food transport container into the fan and lead to rapid fouling thereof.

BRIEF DESCRIPTION OF THE DRAWINGS

In all of the drawings, identical or functionally equivalent elements are denoted by the same reference characters.

DETAILED DESCRIPTION

A food transport container, which is illustrated in FIGS. 1 to 11 and denoted as a whole by 100, comprises a substantially cuboidal container carcass 102, which at its front has a loading and unloading aperture that is closable by means of a door 104.

Figure 1:
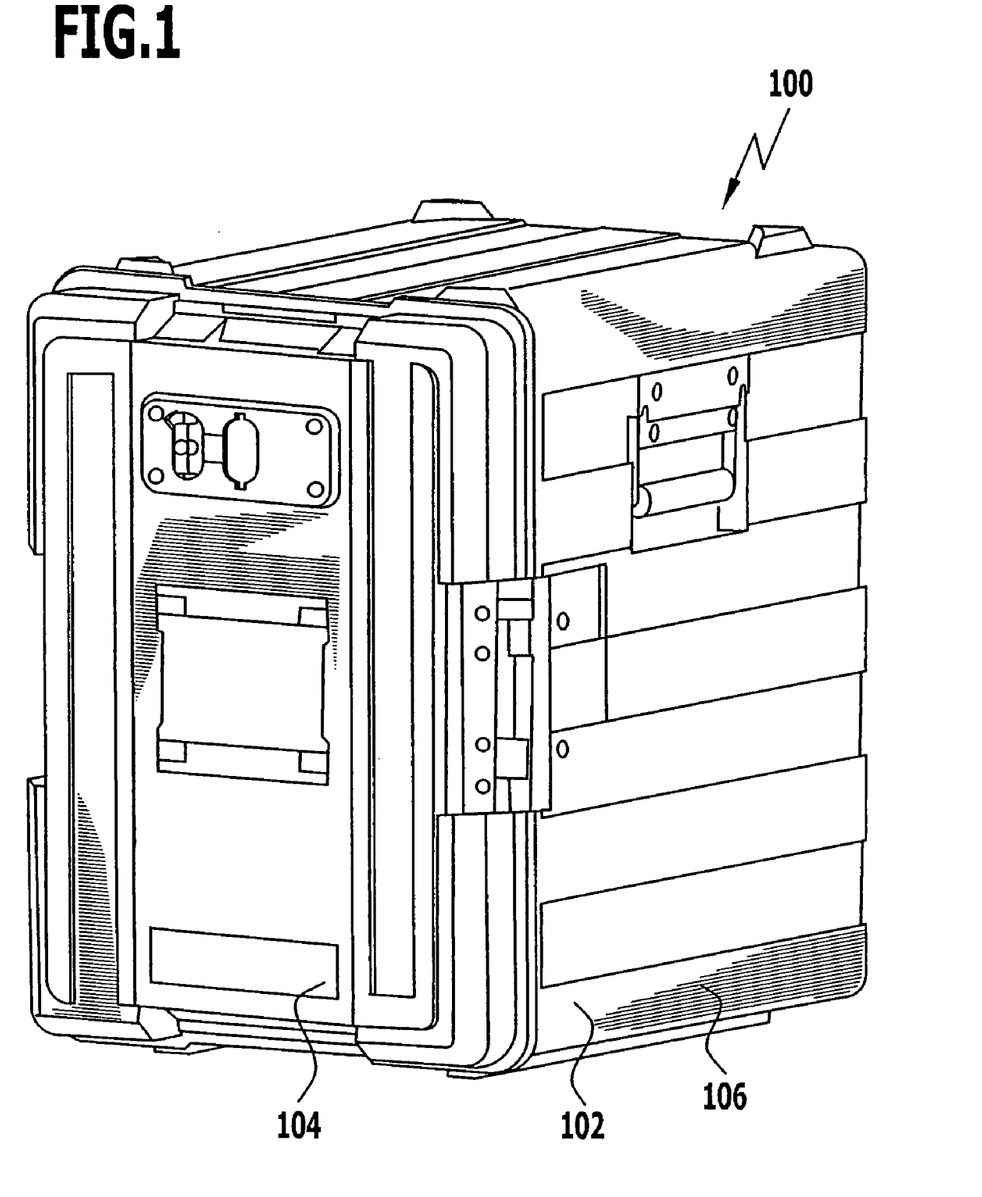
FIG. 1 a diagrammatic perspective view of a food transport container, which is closed at its front by a door.
Figure 2:
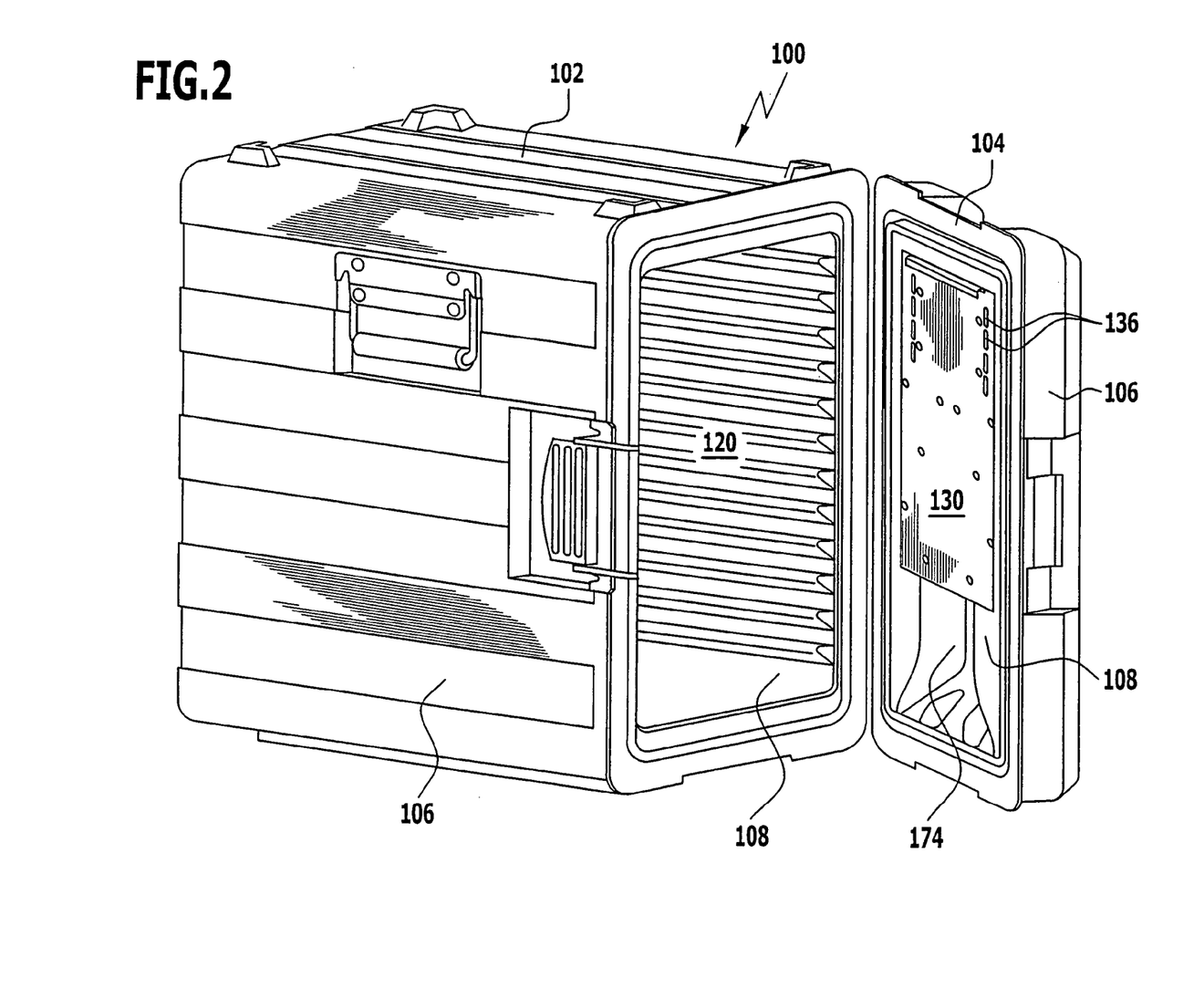
FIG. 2 a diagrammatic perspective view of the food transport container of FIG. 1, with the door open.
Figure 3:
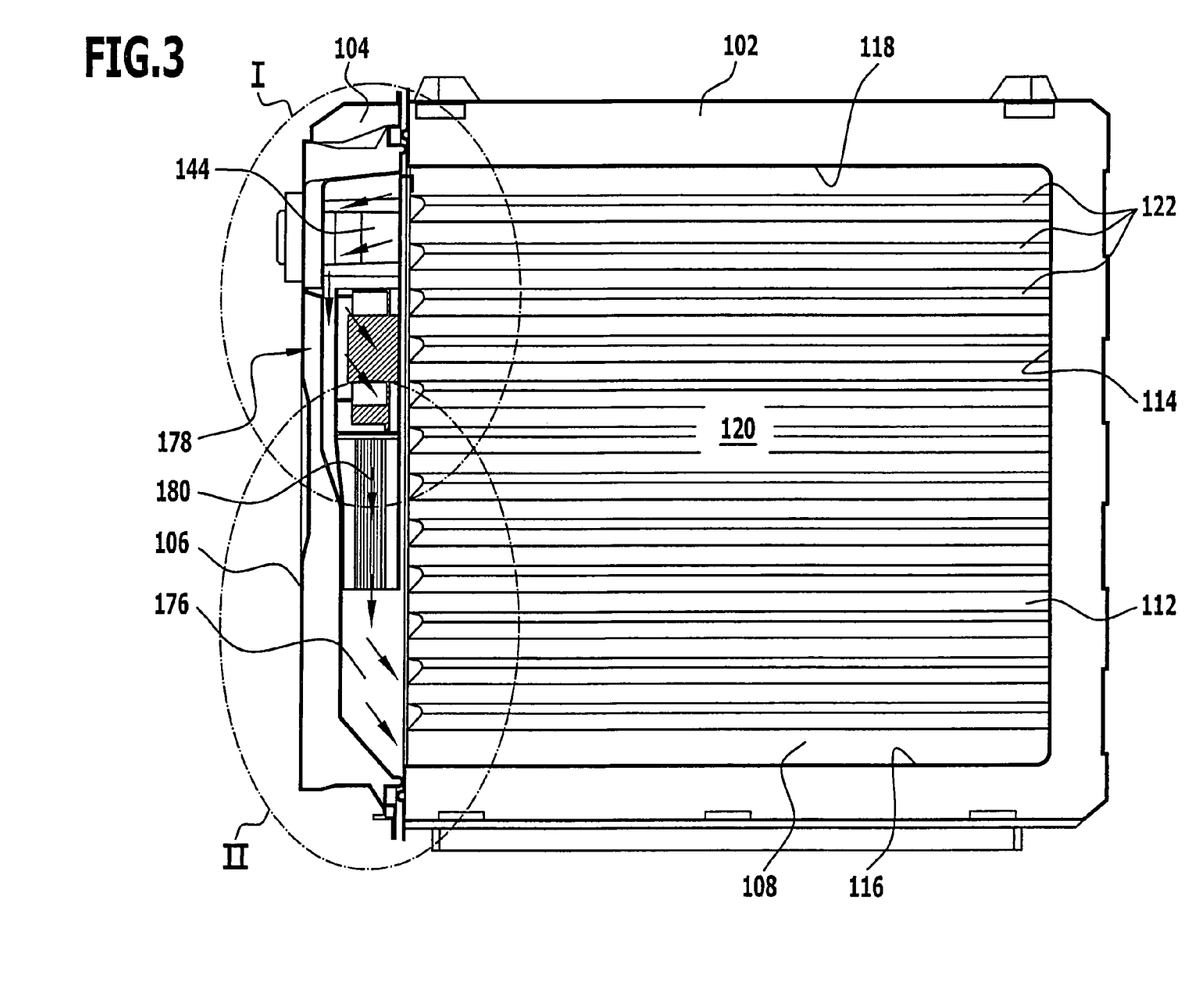
FIG. 3 a diagrammatic vertical longitudinal section through the food transport container of FIG. 1.
Figure 4:
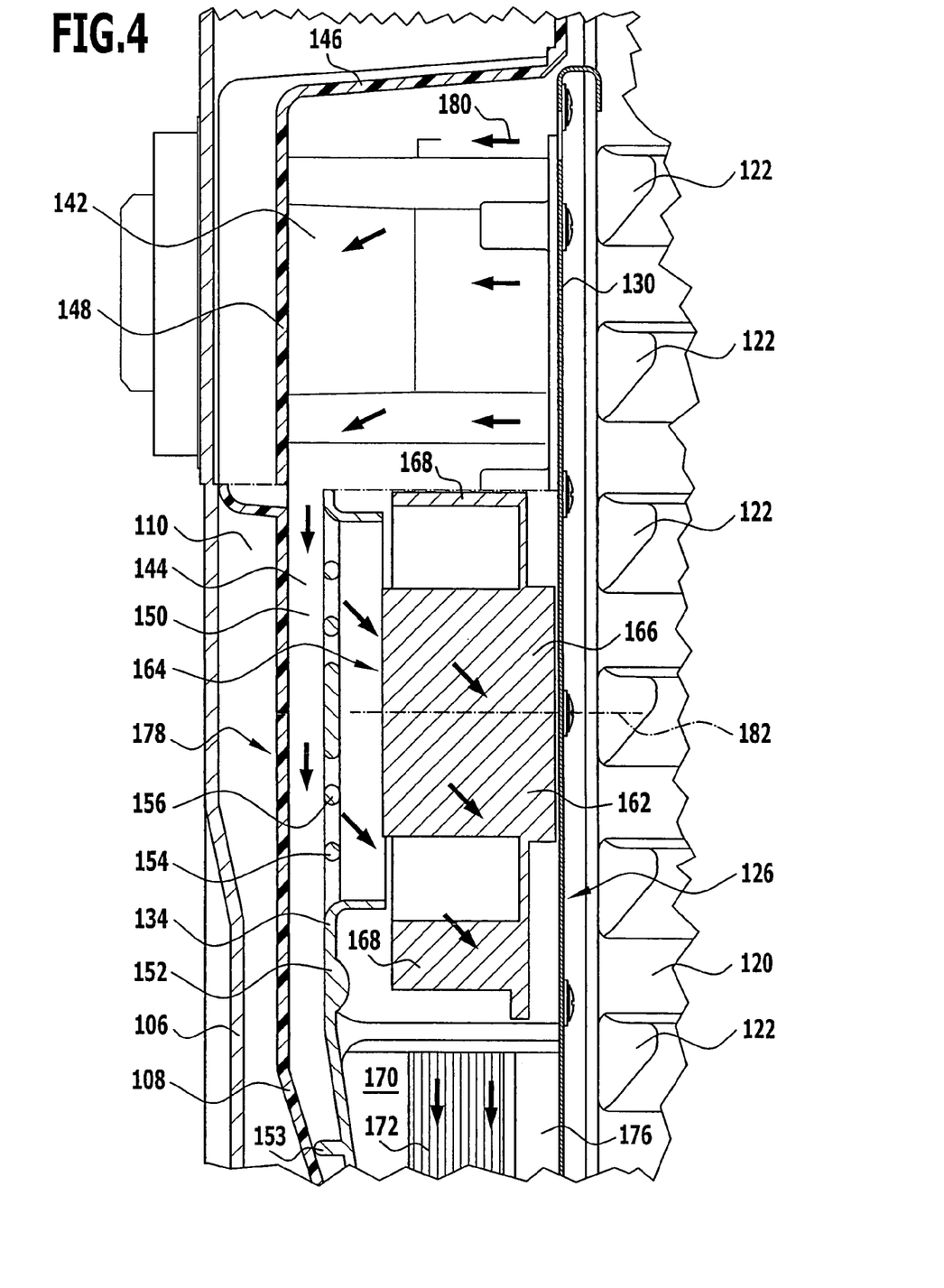
FIG. 4 an enlarged view of the region I of FIG. 3.
Figure 5:
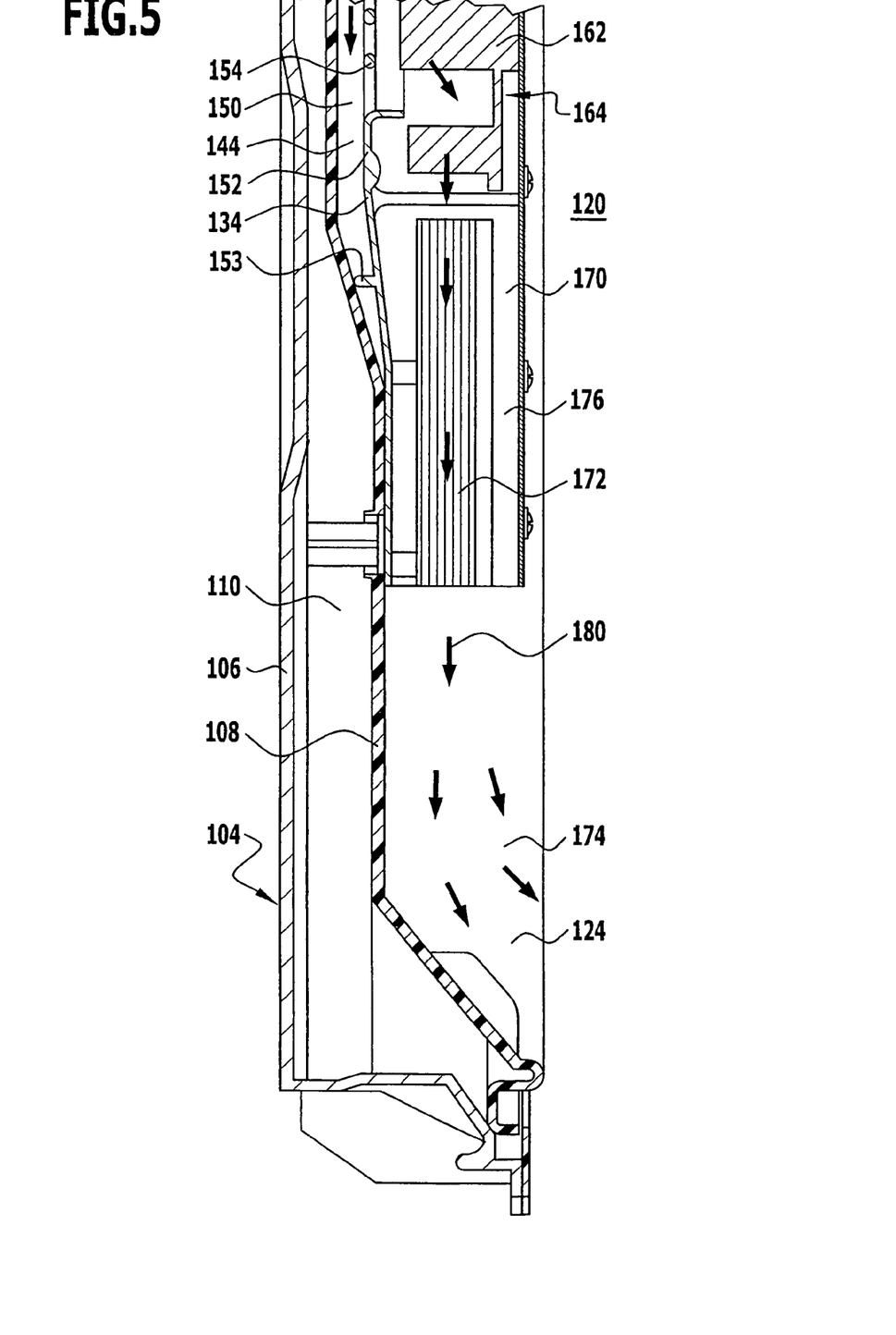
FIG. 5 an enlarged view of the region II of FIG. 3.
Figure 6:
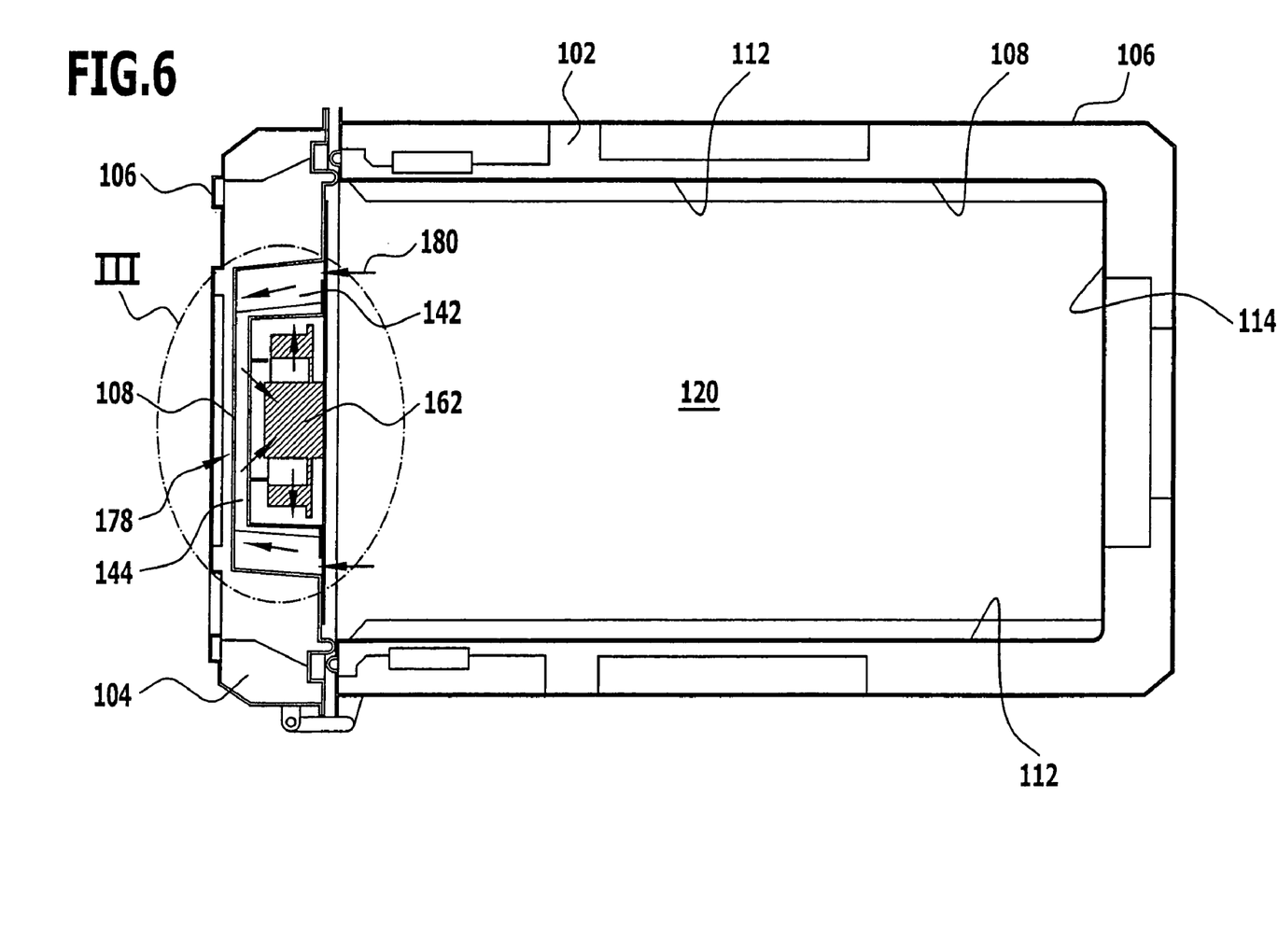
FIG. 6 a diagrammatic horizontal longitudinal section through the food transport container of FIG. 1.

Both the container carcass 102 and the door 104 comprise in each case an outer shell 106 and an inner shell 108, which are connected to one another in such a way as to form between them a liquid-tight intermediate space 110 (see, for example, FIGS. 4 and 5).

The outer shell 106 may be formed from any desired material, e.g. from a metal material, in particular special steel, or from a plastics material, in particular polypropylene.

The inner shell 108 may be formed likewise from a plastics material, preferably from polypropylene.

The intermediate space 110 between the outer shell 106, on the one hand, and the inner shell 108, on the other hand, is filled with a heat-insulating material. This heat-insulating material may be a plastics foam, in particular a polyurethane foam.

The inner shell 108 of the container carcass 102, like the outer shell 106 of the container carcass 102, comprises five walls, namely two mutually opposite vertical side walls 112, a vertical back wall 114, a bottom wall 116 and a top wall 118.

Each of the side walls 112 of the inner shell 108 of the container carcass 102 is provided at its inner side facing the interior 120 of the food transport container 100 with a series of horizontally extending and vertically mutually spaced-apart ribs 122 (see FIGS. 3 and 4), which form supports for trays, racks or standard food containers, which are insertable through the loading and unloading aperture into the container carcass 102.

Figure 9:
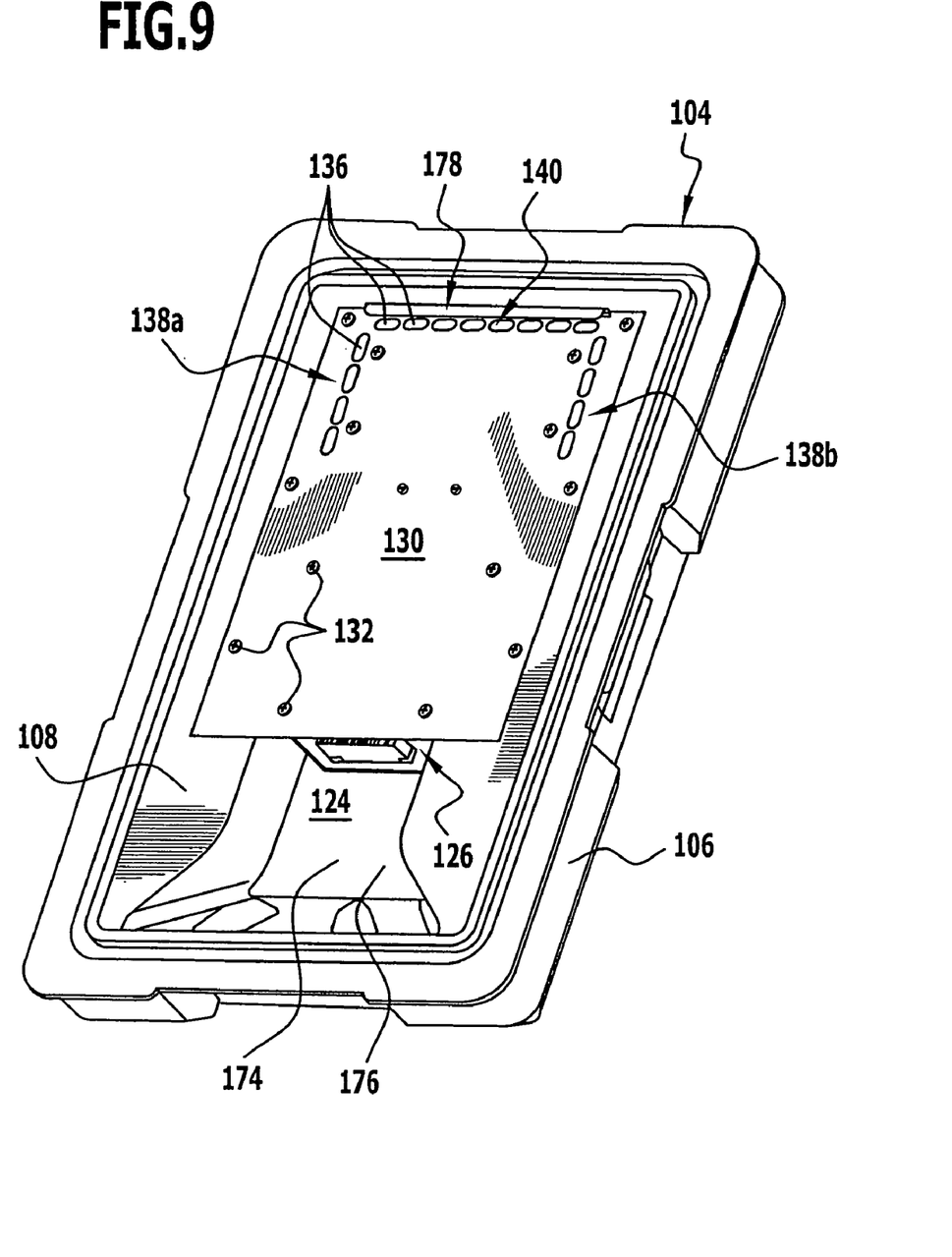
FIG. 9 a diagrammatic perspective view of the door of the food transport container, viewed from the inside of the door.
Figure 10:
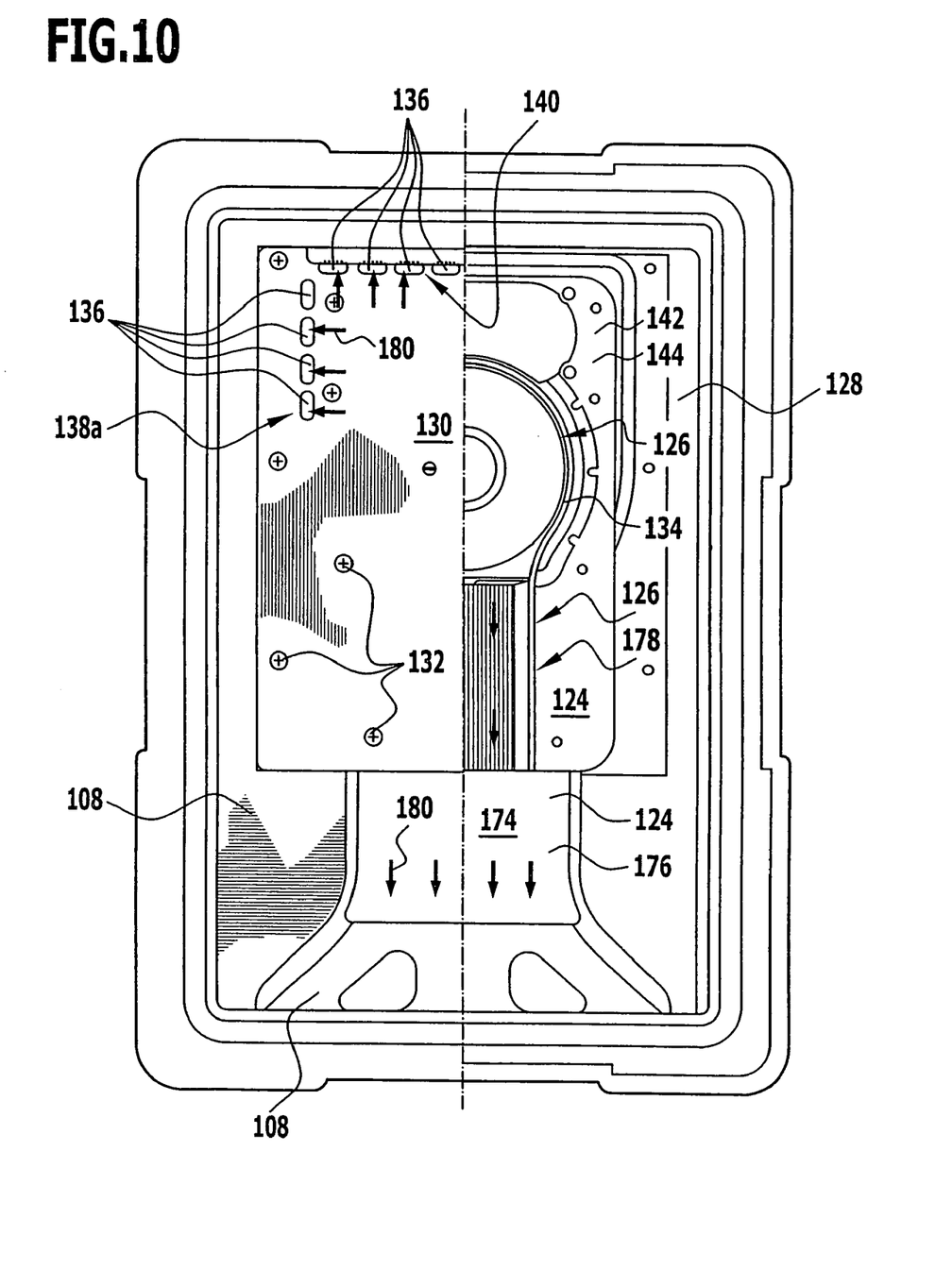
FIG. 10 a diagrammatic plan view of the inside of the door of FIG. 9, wherein a cover plate of an air circulation device accommodated in the door is partially broken away.

As may best be seen from FIGS. 9 and 10, the inner shell 108 of the door 104 of the food transport container 100 is provided at its side facing the interior 120 with a recess 124 for receiving a heating module, which is denoted as a whole by 126.

The heating module 126 and the intermediate space 128 left between the inner shell 108 and the heating module 126 are covered in the direction of the interior 120 of the food transport container 100 by a substantially rectangular cover plate 130, which is fastened by a plurality of fastening screws 132 to the inner shell 108 as well as to a housing 134 of the heating module 126.

The upper half of the cover plate 130 is provided with a plurality of intake openings 136, which take the form of slot-shaped oblong holes and are arranged in three rows, namely in two side rows 138a, 138b along the side edges and in a middle row 140 along the top edge of the cover plate 130.

The intake openings 136 open out at the side of the cover plate 130 remote from the interior 120 of the food transport container 100 into an air-collecting portion 142 of an air intake channel denoted as a whole by 144, which is formed between the inner shell 108, on the one hand, and the housing 134 of the heating module 126 as well as the cover plate 130, on the other hand.

The air-collecting portion 142 of this air intake channel 144 surrounds the housing 134 of the heating module 126 at the upper side thereof and at the left and right side thereof and is delimited in an upward direction and in the direction of its sides by a peripheral wall 146 of the recess 124 that forms part of the inner shell 108, in the direction of the centre of the door 104 by the housing 134 of the heating module 126, in the direction of the interior 120 of the food transport container 100 by the cover plate 130 and in the direction of the outside of the door 104 by a back wall 148 of the recess 124 that likewise forms part of the inner shell 108.

The rear part of the air-collecting portion 142 remote from the cover plate 130 opens out at its radially inner edge (i.e. the edge facing the centre of the door) into an air-forwarding portion 150 of the air intake channel 144 that is delimited, on the one hand, by the back wall 148 of the recess 124 and, on the other hand, by a back wall 152 of the housing 134 of the heating module 126.

This air-forwarding portion 150 has a smaller air flow cross section than the air-collecting portion 142.

The air-forwarding portion 150 is delimited in a downward direction by a projection 153, which projects from the back wall 152 of the housing 134 of the heating module 126 in the direction of the inner shell 108 and rests against the inner shell 108 (see FIG. 4).

Figure 11:
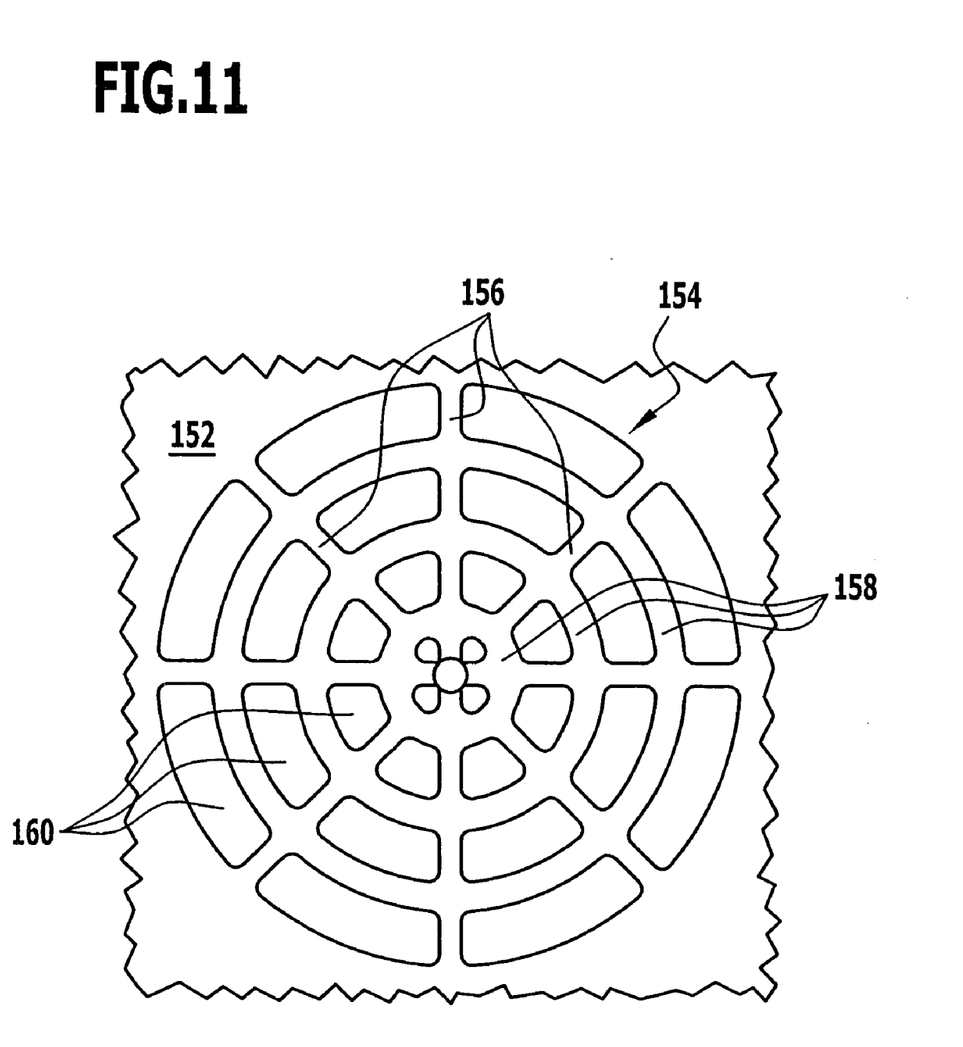
FIG. 11 a diagrammatic plan view of a fan grille of a fan of the air circulation device.

Part of the back wall 152 of the housing 134 of the heating module 126 is formed by the fan grille 154, which is shown in plan view in FIG. 11 and comprises a plurality of, e.g. eight, radial webs 156 as well as a plurality of, e.g. three, circular webs 158, which cut the radial webs 156 in each case at right angles, wherein between the radial webs 156 and the circular webs 158 air through-openings 160 of the fan grille 154 are formed.

Figure 7:
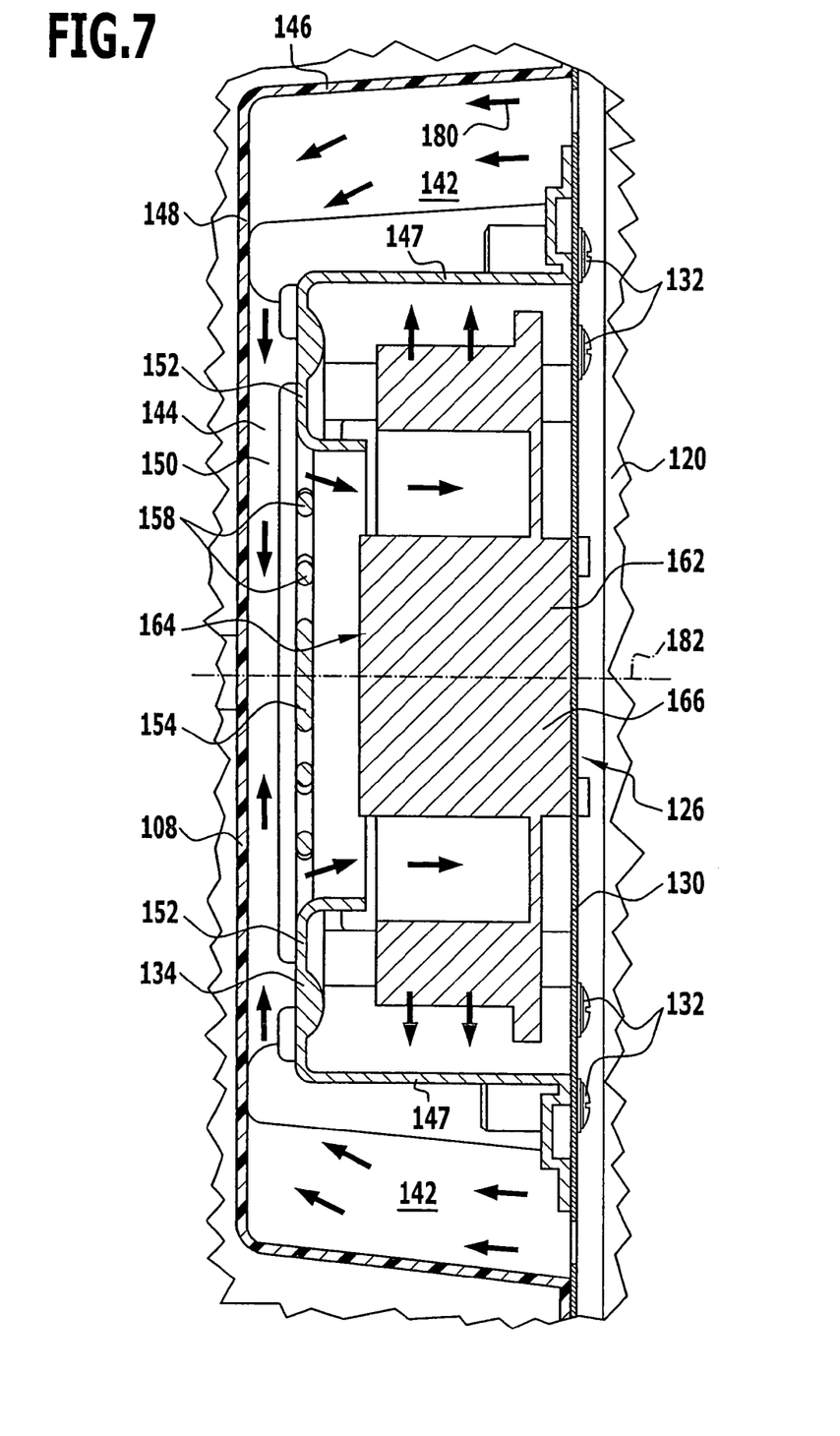
FIG. 7 an enlarged view of the region III of FIG. 6.
Figure 8:
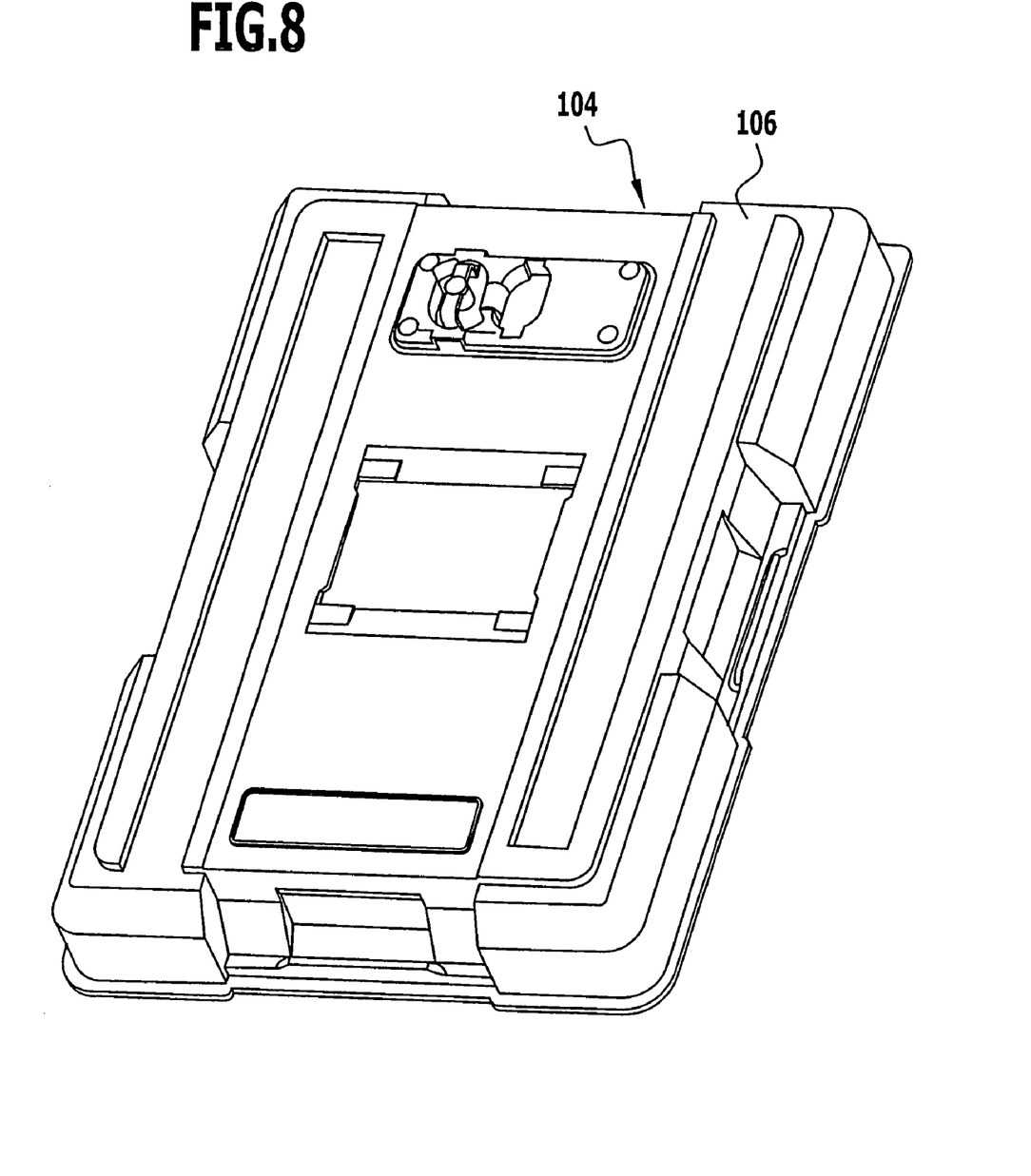
FIG. 8 a diagrammatic perspective view of the door of the food transport container of FIG. 1, viewed from the outside of the door.

As may best be seen from FIGS. 4 and 7, in the housing 134 of the heating module 126 an impeller 162 of a fan 164 is rotatably supported and aligned coaxially with the fan grille 154. The impeller 162 comprises a central, substantially cylindrical hub 166 and fan blades 168 projecting from the peripheral surface of the hub 166.

The fan 164 takes the form of a radial fan, which takes in air in axial direction through the fan grille 154 and blows out air in radial direction down into a heating shaft 170 of the heating module 126 that adjoins the fan 164 in a downward direction.

In the heating shaft 170 heating elements 172, e.g. resistance wires of an electrical resistance heating device, are disposed and, when the heating device is switched on, heat the air flowing from top to bottom through the heating shaft 170.

As may best be seen from FIGS. 9 and 10, the heating shaft 170 at its end remote from the fan 164 opens out into the bottom part of the recess 124 in the inner shell 108 of the door 104, which bottom part forms a blow-out funnel 174 for the air emerging from the heating shaft 170.

The heating shaft 170 and the blow-out funnel 174 together form an air blow-out channel 176.

The air intake channel 144, the fan 164, the heating device with the heating shaft 170, and the air blow-out channel 176 together form an air circulation device 178 of the food transport container 100.

In the heating mode of the food transport container 100, in which mode the food accommodated in the food transport container 100 is to be heated or kept warm, this air circulation device 178 operates as follows:

By means of the fan 164, which has been set in operation, air from the interior 120 of the food transport container 100 is sucked through the intake openings 136 in the cover plate 130 of the door 104 into the air-collecting portion 142 of the air intake channel 144.

The direction of flow of the air through the air circulation device 178 is indicated in the drawings by the arrows 180.

The air, which initially flows substantially at right angles to the cover plate 130 into the air-collecting portion 142, is deflected by the back wall 148 of the recess 124 in such a way that the air flows substantially radially inwards into the air-forwarding portion 150 of the air intake channel 144 and therefore passes into the region of the air intake channel 144 that is situated (viewed from the interior 120 of the food transport container 100) behind the fan 164.

From the air-forwarding portion 150, in which the air flows in substantially radial direction, the air is deflected by the suction force of the fan 164 into the axial direction 182 of the fan 164 and is sucked through the air through-openings 160 of the fan grille 154 into the fan 164.

The impeller 162 of the fan 164 blows out the air, which has been taken in in axial direction, in radial direction into the heating shaft 170.

When the heating device is switched on, the air flowing through the heating shaft 170 is heated by the heating elements 172.

The air that is blown out of the bottom end of the heating shaft 170 into the blow-out funnel 174 passes through the blow-out funnel 174 back into the interior 120 of the food transport container 100, where it heats the food containers and food accommodated in the food transport container 100.

Because the air from the interior 120 of the food transport container 100 is sucked, not directly into the fan 164, but indirectly through the air intake channel 144, wherein the air is deflected a plurality of times in the air intake channel 144 designed as an air labyrinth, dirt particles and other impurities from the interior 120 of the food transport container 100 are prevented from being able to come into direct contact with the fan 164. Rather, such dirt particles and other impurities are previously separated from the air stream in the air-collecting portion 142 of the air intake channel 144. The useful life of the moving components of the air circulation device 178, in particular of the impeller 162, is therefore markedly extended.

From the foregoing, persons of ordinary skill in the art will appreciate that a food transport container of the initially described type has been provided that has a longer maintenance-free operating period and/or a longer useful life.

An example food transport container described herein includes an air circulation device which comprises at least one air intake channel, through which the air is taken in by the fan indirectly from the interior of the food transport container.

The fact, that the air from the interior of the food transport container is not sucked directly into the fan, but is taken in indirectly through the air intake channel, prevents dirt particles and other impurities from the interior of the food transport container being able to come into direct contact with the fan. Rather, such dirt particles and other impurities are previously separated from the air stream in the air intake channel. The maintenance-free operating period and/or the useful life of the moving components of the air circulation device, in particular of an impeller of the fan, are therefore markedly extended.

In a preferred example, it is provided that the air circulation device comprises a cover having at least one intake opening, through which air is drawn from the interior of the food transport container into the air intake channel.

This cover may, in particular, take the form of a cover plate.

So that as many of the particles entrained by the air stream as possible are separated from the air stream before the air stream reaches the fan, it is advantageous when the air in the air intake channel is deflected from its original inflow direction.

It is particularly advantageous when the air in the air intake channel is deflected at least twice.

A particularly good separation of particles from the intake air stream is achieved when the air intake channel is designed as an air labyrinth.

In a preferred example, it is provided that the air intake channel comprises an air-collecting portion and an air-forwarding portion situated, in the air flow direction, downstream of the air-collecting portion.

This air-forwarding portion may in particular have a smaller air flow cross section than the air-collecting portion.

The air intake channel may be formed particularly easily when the food transport container comprises an outer shell and an inner shell, between which a heat-insulating material is disposed, and that at least one region of the side of the inner shell remote from the outer shell forms a boundary of the air intake channel.

Furthermore, the air intake channel may be manufactured particularly easily when the fan is disposed in a housing and at least one region of the housing forms a boundary of the air intake channel.

It is particularly advantageous when the air blow-out channel comprises a portion that is disposed at the rear of the fan remote from the interior of the food transport container. The effect thereby achieved is that the air stream is drawn into the fan from the rear of the fan, for which purpose the intake air stream is deflected at least once from its original flow direction.

It may further be provided that the air circulation device comprises a fan grille having a plurality of air through-openings, through which air is drawn from the air intake channel into the fan.

This fan grille may in particular be disposed at the rear of the fan remote from the interior of the food transport container.

In a preferred example, the fan takes the form of a radial fan, which takes in the air in axial direction and blows out the air in radial direction.

In a preferred example, it is provided that the fan blows out the intake air, not directly into the interior of the food transport container, but into an air blow-out channel of the air circulation device.

This air blow-out channel may at at least one blow-out aperture open out into the interior of the food transport container.

In order that the food and food containers disposed in the interior of the food transport container may be brought to a desired temperature and/or maintained at a desired temperature, it is advantageous if the air circulation device comprises at least one temperature control device for heating or cooling the intake air. By means of the thus temperature-controlled, circulated air the temperature of the food containers disposed in the interior of the food transport container may be indirectly controlled.

Such a temperature control device may in particular comprise an electrical resistance heating device.

When the fan blows out the intake air into an air blow-out channel, it is preferably provided that the temperature control device heats or cools the air situated in the air blow-out channel.

The air circulation device may, in principle, be disposed at any desired point of the food transport container.

However, the air circulation device is preferably disposed on a door of the food transport container that is used to close a loading and unloading aperture of the food transport container.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

We claim:

1. Food transport container, comprising a container configured to store food and to be transportable, the container having a closable interior, an air circulation device in communication with the interior, by which when the container is closed air from the interior is drawn into the air circulation device and returned to the interior, wherein the air circulation device comprises at least one fan and at least one air intake channel, through which the air from the interior is drawn in indirectly by the fan, wherein the air intake channel comprises an air-collecting portion and an air-forwarding portion situated in an air flow direction downstream of the air-collecting portion, wherein the air-forwarding portion has a smaller air flow cross section than the air-collecting portion, and wherein the air circulation device comprises at least one temperature-control device for heating or cooling the air drawn into the air circulation device.

2. Food transport container according to claim 1, wherein the air circulation device comprises a cover having at least one intake opening, through which air from the interior is drawn into the air intake channel.

3. Food transport container according to claim 2, wherein the cover takes the form of a cover plate.

4. Food transport container according to claim 1, wherein the air is deflected, preferably a plurality of times, in the air intake channel.

5. Food transport container according to claim 1, wherein the air intake channel is designed as an air labyrinth.

6. Food transport container according to claim 1, wherein the fan is disposed in a housing and wherein at least one region of the housing forms a boundary of the air intake channel.

7. Food transport container according to claim 1, wherein the air intake channel comprises a portion that is disposed at a rear of the fan remote from the interior of the container.

8. Food transport container according to claim 1, wherein the air circulation device comprises a fan grille having a plurality of air through-openings, through which air is drawn from the air intake channel into the fan.

9. Food transport container according to claim 8, wherein the fan grille is disposed at a rear of the fan remote from the interior of the food transport container.

10. Food transport container according to claim 1, wherein the fan takes the form of a radial fan.

11. Food transport container according to claim 1, wherein the fan blows out the air into an air blow-out channel.

12. Food transport container according to claim 11, wherein the air blow-out channel returns air through at least one blow-out aperture into the interior of the container.

13. Food transport container according to claim 1, wherein the temperature-control device comprises an electrical resistance heating device.

14. Food transport container according to claim 1, wherein the fan blows out the air drawn into the air circulation device into an air blow-out channel and wherein the temperature control device heats or cools the air situated in the air blow-out channel.

15. Food transport container according to claim 1, wherein the container has a door.

16. Food transport container according to claim 15, wherein the air circulation device is disposed on the door of the container.

17. Food transport container according to claim 4, wherein the air is deflected a plurality of times in the air intake channel.

18. Food transport container, comprising a container configured to store food and to be transportable, the container having a closable interior, and an air circulation device in communication with the interior, by which when the container is closed air from the interior is drawn into the air circulation device and returned to the interior, wherein the air circulation device comprises at least one fan and at least one air intake channel, through which the air from the interior is drawn in indirectly by the fan,
    wherein the air intake channel comprises an air-collecting portion and an air- forwarding portion situated in an air flow direction downstream of the air- collecting portion, wherein the air-forwarding portion has a smaller air flow cross section than the air-collecting portion, wherein the container comprises an outer shell and an inner shell, between which a heat-insulating material is disposed, and wherein at least one region of a side of the inner shell remote from the outer shell forms a boundary of the air intake channel, and wherein the air circulation device comprises at least one temperature-control device for heating or cooling the air drawn into the air circulation device.

* * * * *

UNITED STATES PATENT AND TRADEMARK OFFICE
CERTIFICATE OF CORRECTION

PATENT NO. : 7,565,066 B2 Page 1 of 1
APPLICATION NO. : 11/070179
DATED : July 21, 2009
INVENTOR(S) : Hipp et al.

It is certified that error appears in the above-identified patent and that said Letters Patent is hereby corrected as shown below:

Col. 6 lines 12-14: The text "4. Food transport container according to claim 1, wherein the air is deflected, preferably a plurality of times, in the air intake channel." should read -- 4. Food transport container according to claim 1, wherein the air is deflected in the air intake channel. --

Signed and Sealed this

Third Day of November, 2009

David J. Kappos
*Director of the United States Patent and Trademark Office*